Patented Feb. 18, 1941

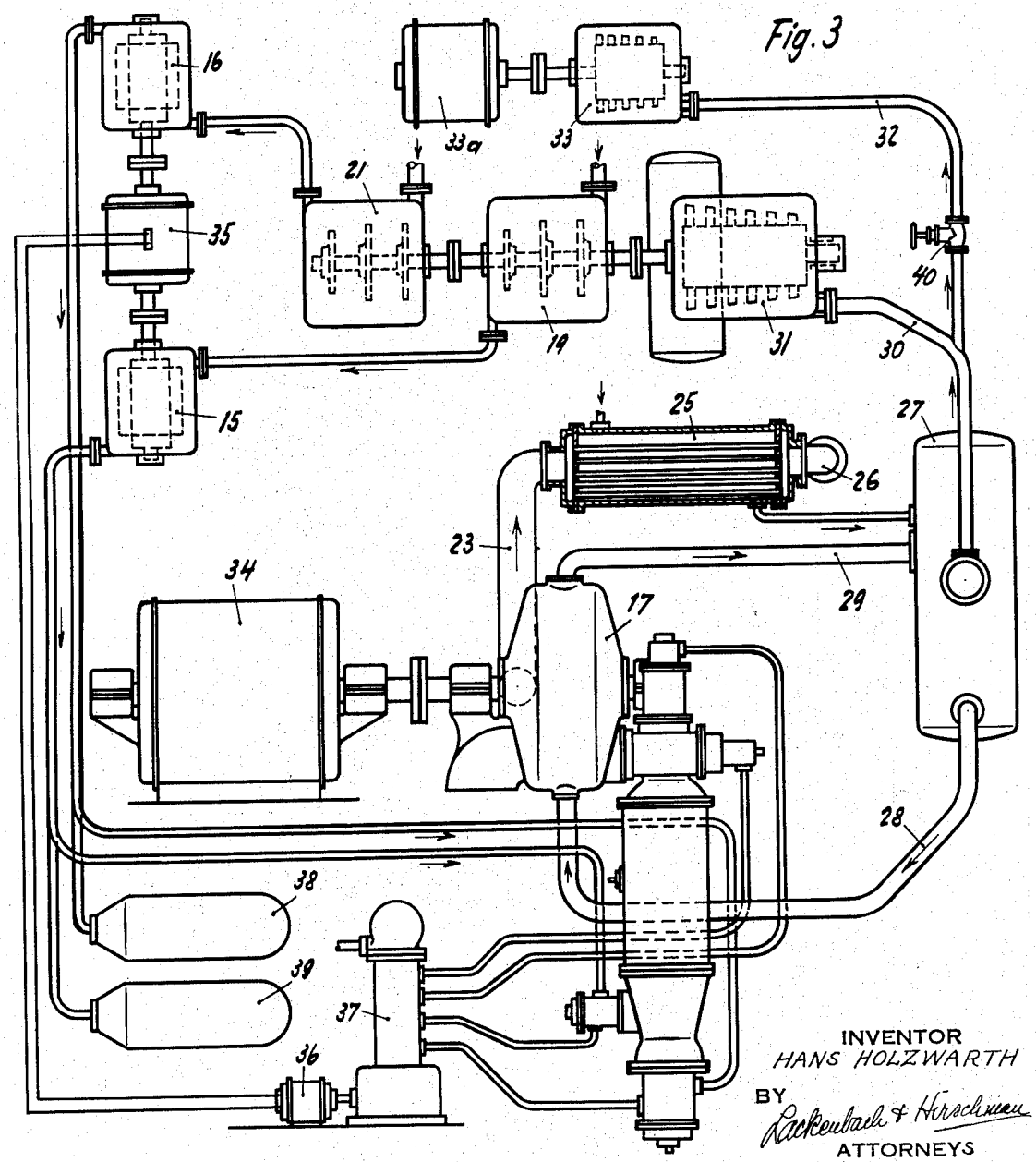

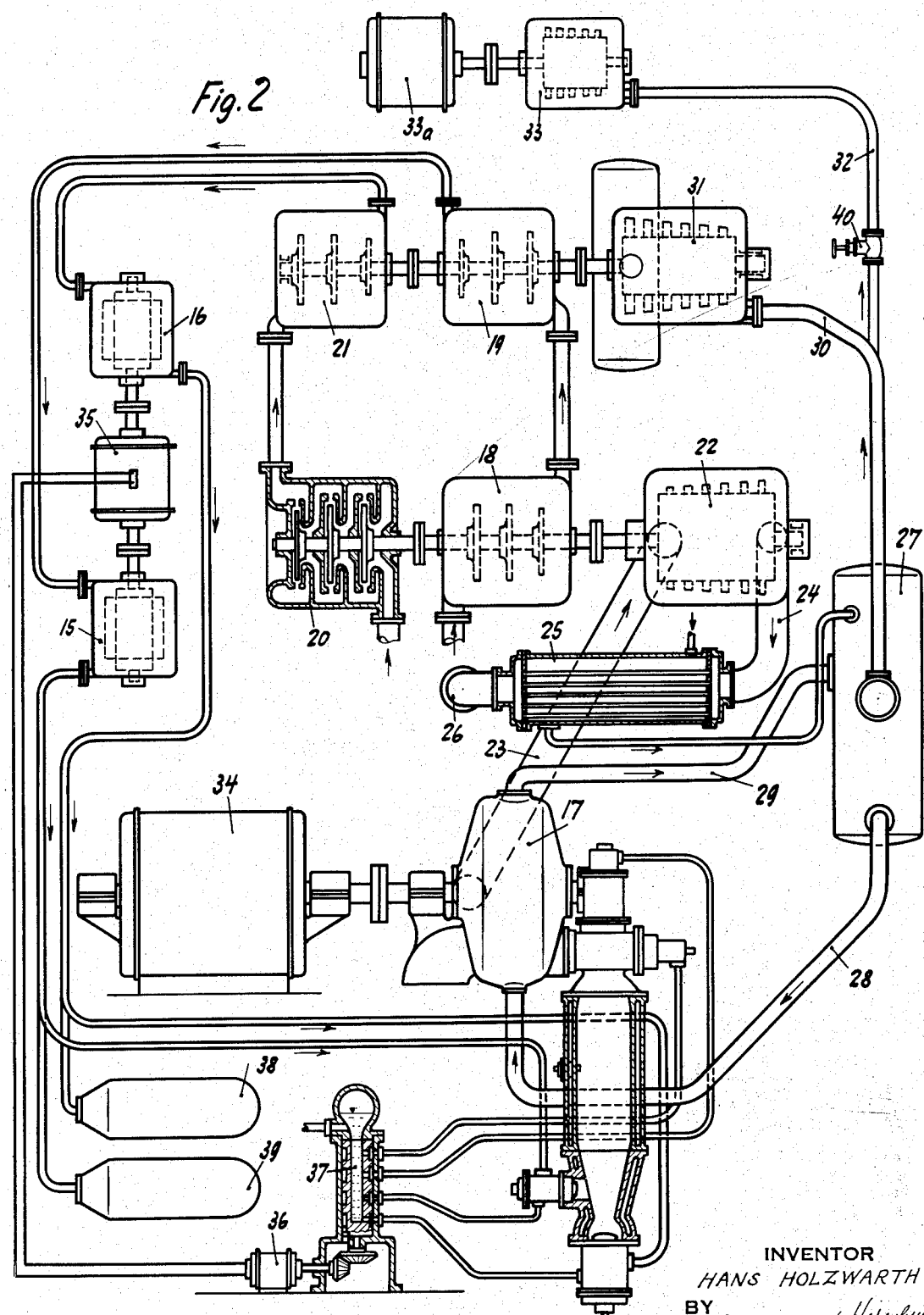

2,231,912

UNITED STATES PATENT OFFICE 2,231,912

METHOD AND APPARATUS FOR CHARGING EXPLOSION CHAMBERS WITH PRECOMPRESSED OPERATING MEDIA

Hans Holzwarth, Dusseldorf, Germany, assignor to Holzwarth Gas Turbine Co., San Francisco, Calif., a corporation of Delaware Application February 12, 1937, Serial No. 125,451
In Germany February 15, 1936

21 Claims. (Cl. 60—49)

The present invention relates to power and other plants operated by combustion gases, and more particularly to plants wherein the driving or operating medium comprises explosion gases generated in constant volume explosion chambers, and to an improved method and apparatus for charging such chambers with compressed operating media.

It is known that in the energy economy of combustion engines in which compression of the operating media takes place externally of the actual combustion space, the work expenditure necessary for accomplishing this compression plays a controlling part and it has accordingly been the prior practice in the determination of the type of compressor to be used to make certain only that a compressor with a high efficiency was employed whose construction at the same time was such as to yield the necessary compression work.

I have found that the methods of operation more recently suggested for explosion chambers of the constant volume type can be carried out in a highly satisfactory manner only when the conditions necessary therefor are realized by suitable regulation of the compression process. This regulation includes the charging of volumetrically correct quantities of gaseous operating media (air, fuel gas) during each chamber cycle under different load conditions; and in the mode of operation wherein a practically planar dividing layer or zone is required to be maintained between the residual combustion gases of a preceding explosion (which are to be expelled during the scavenging) and the new charge of operating media entering the explosion chamber, in order to prevent mixing of the new charge with residual gases, regardless of whether the new charge consists of combustion-supporting air alone or of fuel, or of a mixture of the two (preferably in non-explosive proportions), it is important that the compressed medium be charged in a uniform and shock-free manner. In this way the residual combustion gases can be driven out of the explosion chamber, without mixing with the incoming air or fuel, to as thorough an extent as is necessary from the standpoint of the whole process.

The present invention is based upon the recognition that the rotary piston compressor represents a device which takes up and delivers volumetrically exact quantities of air or gas mixture to be charged into the explosion chambers, this type of compressor being distinguished from the reciprocating piston compressor by the fact that the chamber in which the compression takes place diminishes in volume continuously and practically without shock during its uniform rotation. By the use of such rotary piston compressor there is attained an exact measurement of the quantities of compressed media to be charged into the explosion chamber, these media being thus supplied in uniform manner and practically without shock. This mode of compression thus presents all of the conditions necessary for maintaining unchanged the position and form of the dividing layer or zone above described.

The method of charging explosion chambers, particularly of explosion turbines, working with precompressed operating media, proposed by the present invention is accordingly distinguished by the fact that equal volumes of the medium to be compressed are divided off and the so separated volumes are compressed to the charging pressure in rotating chambers which are continuously reduced in size without shock, whereupon the compressed medium is discharged from the compression chamber into the explosion chamber.

In order to obtain the correct measurement of the air and gas volumes even upon change in the cycle number of the explosion chamber, it is proposed in a further development of the invention to vary the time intervals within which the compression is effected in the rotating chambers of the compressor, proportionately or nearly proportionately with the time intervals which elapse between the opening and closing moments of the control members of the explosion chamber throughout the whole range of regulation. As these control devices are generally actuated by a compressed medium which in turn is controlled by a rotating distributor, such as that shown in my U. S. Patent No. 877,194, the driving apparatus for this distributor or the control shaft is coupled with the driving mechanism of the rotary piston compressor in any suitable manner. If both devices are driven electrically, then an electrical coupling is the simplest one.

The present invention is of particular advantage in large explosion turbine power plants such as are described hereinbelow, such plants utilizing explosion chambers of more than 100 liter capacity, larger plants utilizing in fact explosion chambers having a capacity of many hundreds of liters. Rotary piston compressors are inherently not suited for the delivery of such large volumes; and it is accordingly proposed in accordance with the invention to conduct the operating medium in precompressed condition to the rotating chambers of the rotary piston compressor. In view of the fact that with the continuous development in the technology of explosion chambers, the trend has always been toward higher charging pressures, it should prove to be advantageous to conduct the medium to be compressed to the rotary piston compressor repeatedly precompressed, since with high charging pressures, as will be explained below, the sources of energy arising in the operation of this type of explosion chambers are so various and the available energies at times so great that the power for driving the individual compression stages is readily available.

The apparatus for carrying out my improved process can be constructed in any desired manner. The whole compression system is, however characterized by the use of a rotary piston compressor in the last compression stage which is directly connected with the explosion chamber. Where, in exceptional cases, only a single compression stage is employed, such stage is built in the form of rotary piston compressors.

On the accompanying drawing is shown by way of example a practical embodiment of the invention. In said drawing Fig. 1 shows a vertical section through a rotary piston compressor constructed in accordance with the invention;

Fig. 2 illustrates diagrammatically an explosion turbine plant in which the compressor of Fig. 1 is employed as the last compression stage, the plant being designed to operate with relatively high charging pressures; and Fig. 3 shows a simplified arrangement.

The rotary piston compressor shown in Fig. 1 consists in known manner of a rotary body 1 which is fixed to a rotary shaft 2 eccentrically journalled within the housing. Intermediate vanes 3 are slidingly supported within the rotary body, such vanes being so disposed under the influence of centrifugal force or of special guiding devices that during the compression they have a practically negligibly small play with reference to the walls 2a forming the housing bore for the body 1. These vanes 3 thus form chambers which are continuously reduced in size in the direction of rotation along a portion of their path, and in a practically shock-free manner, so that they divide off equal volumes of operating medium introduced into the compressor at 4 and continuously and practically without shock compress these volumes up to the charging pressure. The compressed operating medium is discharged into the conduit leading to the explosion chamber or chambers from the outlet 5 of the compressor. Thus, for example, the compression chamber 6 in the illustrated position of the rotary piston 1—3 is completely filled with the operating medium to be compressed and in the position shown at 7 reaches its greatest volume. From the position 7 on, and in the direction of rotation (counterclockwise), this volume continuously decreases as the compression chamber 6, in consequence of the rotation imparted to the rotary body 1 by the shaft 2, is shifted into the successive positions indicated by the numerals 8 to 12. In the 12 position the volume of the compression chamber 6 has fallen to approximately the desired end value so that the pressure of the operating medium confined in the compression chamber in this position corresponds very nearly to the charging pressure. As the body 1 continues to rotate the volume of the compression chamber decreases further to a slight degree until as the chamber enters the 13 position the operating medium is discharged at the desired charging pressure into the explosion chamber, while the compression chamber becomes again closed as it reaches the 14 position in which an extremely small clearance space is left free. What has been said with reference to the chamber 6 applies of course to all of the other compression chambers defined by the walls 3 of the rotary piston, so that altogether a continuous flow to the explosion chamber occurs with an exact volumetric division of the operating medium to be compressed or an exact volumetric distribution of the compressed medium. This in combination with the continuous and practically shock-free reduction of the volume of the compression chambers has the result that when this mode of compression is employed for the medium introduced during the scavenging period, and in contrast to compression by means of a turbo- and piston compressor, any influence on the position and form of the dividing zone or layer in the explosion chamber during scavenging is avoided.

If the operating medium is conducted to the compressor in precompressed condition, then turbo-compressors are particularly suited for effecting this preliminary compression, especially when they are driven by turbines operated by steam which can be produced in the required amount by the utilization of the waste heat of the plant. The regulation of the weight of charged material is advantageously carried out in this case by varying the speed of the turbo-compressor which performs the pre-compression of the operating medium. If this turbo-compressor is driven by a steam turbine, an extremely economical regulation is made possible by regulation of the speed of the steam turbine.

If still higher charging pressures are to be employed, the waste heat of the plant will ordinarily no longer suffice to produce the steam required for driving the additional compression stage which will be necessary in such case. As, however, higher charging pressures lead to unusually large expansion ratios which must be utilized in the explosion turbine (impulse wheel) and in the stages following such turbine, combustion gas turbine stages are available for supplying the additional power for operating the additional compression stage. These combustion gas turbine stages, which are built throughout in the form of continuous current turbines, utilize the combustion gases whose temperature has already been strongly reduced by the tremendous expansion to which they have been subjected in the preceding stages, so that their conveyance to the continuous current turbines operating the additional compression stages presents no difficulties. These additional compression stages are preferably again built in the form of turbo-compressors.

Of course, the amount of steam produced by the waste heat of the plant, if it suffices at full load for operating the steam turbine which drives the precompressing turbo-compressor, will no longer correspond to the steam requirement when the load on the plant falls. In fact an excess of steam will arise which, if no immediate use for this kind of steam exists in the plant, can be utilized in a separate turbo-generator.

The rotary piston compressor constructed as shown in Fig. 1 is shown in the plant illustrated in Fig. 2 at 15 and is employed for compressing the gaseous fuel, and at 16 is shown a similar compressor for compressing the combustion supporting air immediately in advance of the explosion chamber or chambers of the explosion turbine 17, the chambers and turbine not being shown in detail as the construction of the same is well known. In view of the circumstance that the explosion chambers of the explosion turbine 17 are operated with relatively high charging pressure and in view of the known fact that rotary compressors are not suitable for feeding very large volumes, a two-fold precompression of the gaseous fuel occurs in the turbo-compressors 18 and 19 and of the air in the turbo-compressors 20 and 21. The turbo-compressors 18 and 20 are driven by a continuous current gas turbine 22 which by way of the conduit 23 receives the exhaust gases of the explosion turbine 17, the gases having given up in the latter a large part of their energy. The gases exhausting from the continuous current turbine 22 pass through the conduit 24 into the waste gas heat exchanger 25 and are discharged into the atmosphere at 26 after they have given up substantially all of their sensible heat. In the heat exchanger 25 there may be heated, for example, the feed water for the vaporizer 27. The water in the vaporizer 27 flows by way of the conduits 28 and 29 through the cooling jackets of the explosion turbine 17 and thus absorbs so much heat, under pressure, that high pressure steam separates out in the vaporizer. This steam flows through conduit 30 to the steam turbine 31 which drives the turbo-compressors 19 and 21.

The number of chambers in the compressor 1 is sufficiently numerous to bring about a subdivision of each charge of air or gas to such an extent that the flow of air or gas from the compressor to the explosion chamber is practically uniform, that is, is free from shock and violent impulses such as would destroy the dividing layer or zone between the incoming charge and the residual combustion gases to be expelled thereby when such charge is introduced during the scavenging period of a chamber designed for operation in this manner, as by being made of elongated form and provided with conical inlet and outlet sections. In Fig. 1, I have shown a compressor containing 18 such chambers of diminishing volume. The number of compression chambers can of course be higher or lower, a higher number yielding a more uniform flow and vice versa. The lower limit of the number of chambers which will produce a satisfactory flow, that is a flow free from shock, can be determined by simple experiment for any particular arrangement. I have found, however, that in general the number of chambers should be at least about 10.

The total regulation of the plant is accomplished as much as possible by regulation of the feed of steam into the steam turbine 31. In this way the speed of the turbine is varied and hence that of the compressors 19 and 21. There is thus varied in the most economical fashion the degree of precompression of the operating media (gas and air) which are to be conducted to the rotary piston compressors 15 and 16 in precompressed condition. With the degree of precompression there is varied in turn the degree of final compression of the operating media conducted to the explosion chambers. In consequence, the explosion pressure and the expansion ratio are changed. There follows a change in the pressure of the exhaust gases in the conduit 23 and hence in the admission pressure of the operating medium of the continuous current turbine 22 which produces corresponding effects upon the speed of the turbo-compressors 18 and 20. The first precompression is thus also adjusted in an economical manner and completely automatically to the prevailing conditions.

The steam produced in excess on partial loads may be conducted, if there is no immediate use therefor, to the turbo-generator 33, 33a by way of conduit 32 and is utilized therein. The feed of steam to the turbine 33 may be controlled by the valve 40 which may serve also as the means for controlling the feed of steam into the turbine 31 for regulation of the plant. The explosion turbine itself operates the generator 34.

The same plant can be utilized with suitable modification when small charging pressures are to be employed. In such case, as shown in Fig. 3, the construction of the plant is simplified by the elimination of the turbo-compressors 18 and 20 and of the continuous current turbine 22. The exhaust gases of the explosion turbine unit 17, which in addition to the actual explosion or impulse turbine has a continuous current turbine following the latter and built as a structural unit therewith, pass directly from the conduit 23 into the exhaust-gas heat exchanger 25. The turbo-compressors 19 and 21 in such simplified plant suck in air or gaseous fuel at atmospheric pressure.

With still lower charging pressures or with smaller volumes of operating media, the turbo-compressors 19 and 21 and the steam turbine 31 can be eliminated. In such a plant the compression is accomplished exclusively by the rotary piston compressors 15 and 16.

As explained above, an electrical drive of the rotary piston compressor is preferred, regardless of whether the compressor forms the only or the last compression stage, because such drive offers the possibility of altering the speed of the rotary piston compressor proportionately or nearly proportionately with the cycle frequency of the explosion chamber or chambers, that is, with the control shaft speed or the speed of the distributor, as the latter is always driven electrically. As shown on the drawing, the rotary piston compressors 15 and 16 are driven by an electric motor 35. The rotary distributor, which is shown at 37 and in known manner controls the flow of pressure fluid to the operating pistons of the valves of the explosion chambers, is likewise driven by an electric motor, shown at 36, so that electrical coupling between the distributor and the rotary piston compressors is rendered possible.

Where the rotary piston compressor comprises the only compressor stage, the regulation of the compressor with respect to the volumes of operating media with which the explosion chambers is to be charged is accomplished in the simplest and most advantageous manner by throttling the suction conduit of the compressor.

Equalizers 38 and 39 may be provided in the fuel and air lines to equalize any pressure fluctuations that may arise therein.

Although in the illustrated embodiment of the invention the air is charged into the chamber at one pressure, my invention can be utilized also with super-charging processes in which air or air and fuel of higher pressure are introduced into the explosion chamber following a charge of lower pressure air. In such super-charging processes, it is quite as important to maintain a substantially uniform, measured delivery of compressed medium to the explosion chambers as in those processes in which the introduced medium is caused to take the form of a piston and push the residual combustion gases before it out of the explosion chamber. For in the proper regulation and efficient operation of an explosion turbine plant, it is important that proper mixing of air and fuel take place, and especially atomized liquid fuel, and that correctly measured and proportioned quantities of air and fuel be introduced into the explosion chamber per cycle. In large stationary power plants, where the volume of each explosion chamber is over 100 liters, and may even be over 700 liters, and wherein the length of each chamber may be several feet and as much as 8 or 9 feet or more, proper regulation of the output of each chamber under different load conditions and the maintenance of constant output under normal conditions require a uniform and correct rate of flow of compressed medium into the chambers, for upon this will depend in large measure the proper mixing of fuel and air and the proper control of various other phenomena in the explosion chamber. While, therefore, the unexpected utility of a rotary piston compressor in connection with a constant volume explosion chamber is most readily apparent when the compressed medium is employed for effecting expulsion of residual gases without any substantial mixing, such utility extends also to other phases of the constant volume explosion chamber cycle, and includes the step of introducing, into an already scavenged and closed chamber a quantity of high pressure medium, for example, very high pressure air which may be employed to atomize liquid fuel in addition to raising the pre-ignition pressure. Other variations may be resorted to within the scope of the appended claims without departing from the spirit of the invention. An exact description of the dividing zone or layer as outlined above is given in my United States Patent No. 2,010,020; a complete section through an explosion turbine of the type presented by the turbine 17 in Fig. 2 is shown in the United States Patent No. 2,010,823.

I claim:

1. The method of charging elongated explosion chambers of constant volume explosion turbines with a precompressed operating medium, the chambers being of curvilinear cross-section, including the steps of dividing off equal volumes of the medium to be compressed and reducing such volumes in a continuous and substantially shock-free manner until the charging pressure is reached, and then, following an explosion in the chamber and the escape of the explosion gases therefrom, discharging the compressed medium into the explosion chamber when the pressure in the latter has fallen to such a degree that a substantially planar dividing zone is established between the incoming charge and the residual combustion gases of the explosion.

2. The method according to claim 1, wherein the time interval within which the compression is effected is altered throughout the whole range of regulation of the explosion chamber approximately proportionately with the change in the intervals between the opening and closing moments of the control members of the explosion chamber.

3. The method according to claim 1, wherein the medium to be compressed is initially compressed to an intermediate pressure.

4. The method according to claim 1, wherein the medium to be compressed is initially precompressed a number of times to successively higher intermediate pressures.

5. The combination with an elongated constant volume explosion chamber of curvilinear cross-section having an inlet member and an outlet member at opposite ends thereof, of apparatus for supplying said chamber with a precompressed operating medium, said apparatus including a rotary piston compressor in the compression stage immediately in advance of the explosion chamber and having means providing therein chambers of diminishing volume from the inlet to the discharge sides thereof, the medium being thus gradually compressed within the compressor, the number of compression chambers and the speed of the compressor being such that a substantially shock-free, measured delivery of compressed medium occurs, and timing mechanism acting to open the inlet member when the pressure in the explosion chamber has fallen to such a degree that a substantially planar dividing zone is established between the incoming charge and the residual combustion gases of the explosion.

6. The combination according to claim 5, including driving motors for the compressor and the timing mechanism, said motors being coupled together electrically.

7. The combination according to claim 5, including one or more turbo-compressors in advance of the rotary piston compressor for precompressing the operating medium fed to the rotary piston compressor.

8. The combination according to claim 5, including one or more turbo-compressors in advance of the rotary piston compressor for precompressing the operating medium fed to the rotary piston compressor, a steam turbine for driving the turbo-compressor, means for generating steam with the waste heat of the plant, and a conduit for conducting the steam to the steam turbine.

9. An explosion turbine plant comprising one or more explosion chambers, an impulse turbine driven by the gases generated in said chambers, one or more continuous current turbines driven by the gases exhausting from the first turbine, apparatus for compressing the operating media fed to the explosion chambers and including a rotary piston compressor immediately in advance of the explosion chambers, a turbo-compressor in advance of the rotary piston compressor and charging into the latter, a steam turbine for driving said turbo-compressor, a second turbo compressor for precompressing the medium received by the first mentioned turbo-compressor, said second turbo-compressor being driven by one of the continuous gas turbines.

10. The combination according to claim 5, including one or more turbo-compressors in advance of the rotary piston compressor for precompressing the operating medium fed to the rotary piston compressor, a steam turbine for driving the turbo-compressor, means for generating steam with the waste heat of the plant, a conduit for conducting the steam to the steam turbine, a turbo-generator and means for conducting thereto the steam generated in excess during partial load on the plant.

11. An explosion turbine plant comprising one or more constant volume explosion chambers having inlet and outlet mechanism, an impulse turbine driven by the gases generated in said chamber, apparatus for compressing an operating medium fed to the explosion chambers and including a rotary piston compressor immediately in advance of the explosion chambers, a delivery conduit between the compressor and the chamber or chambers, said compressor having a plurality of variable compression chambers which diminish in volume from the inlet to the delivery side of the compressor and thus effect compression therein of measured, individual portions of the medium fed thereto, and a compressor in advance of the rotary piston compressor and discharging the medium at super-atmospheric pressure into said rotary piston compressor, and means for driving the compressors, the number of compression chambers in the rotary piston compressor being so large and the normal speed of its driving means being such that the compressor delivers the compressed portions at such a high rate that a substantially uniform flow, free from shock-like pulses, to the inlet mechanism of the explosion chambers is maintained.

12. An explosion turbine plant as set forth in claim 11, including a steam turbine for driving the second mentioned compressor, means for generating steam with the waste heat of the explosion turbine plant, a conduit for conducting such steam to the steam turbine, and means for controlling the supply of steam to the latter for effecting regulation of the plant.

13. The combination according to claim 5, including control mechanism for governing the opening and closing of the inlet and outlet members and constructed to keep the outlet member open during the initial portion of the open period of the inlet member to enable the entering compressed medium to displace the residual gases of a preceding explosion which are expelled through the still open outlet member.

14. The combination as set forth in claim 5, wherein the number of chambers in the compressor is of the order of eighteen.

15. The method according to claim 1 wherein each charge is divided into about eighteen portions which are individually compressed.

16. The combination of a constant volume explosion chamber, having inlet and outlet mechanism, a rotary piston compressor connected with the explosion chamber to deliver a compressed operating medium directly to the inlet mechanism of the explosion chamber, said compressor having a plurality of variable compression chambers which diminish in volume from the inlet to the delivery side of the compressor and thus effect compression therein of measured, individual portions of the medium fed thereto, and means for driving the compressor, the number of compression chambers in the rotary piston compressor being so large and the normal speed of its driving means being such that the compressor delivers the compressed portions at such a high rate that a substantially uniform flow, free from shock-like pulses, to the inlet mechanism of the explosion chambers is maintained.

17. The combination with an elongated constant volume explosion chamber having an inlet member and an outlet member at opposite ends thereof, and a turbine arranged to be driven by the gases generated in the chamber, of apparatus for supplying said chamber with a precompressed operating medium, said apparatus including a rotary piston compressor in the compression stage immediately in advance of the explosion chamber, said compressor having a plurality of variable compression chambers which diminish in volume from the inlet to the delivery side of the compressor and thus effect compression therein of measured, individual portions of the medium fed thereto, means separate from the turbine for driving the piston compressor, the number of compression chambers of the piston compressor and the normal speed of the compressor driving means being such that a substantially shock-free, measured delivery of compressed medium to the explosion chamber occurs, timing mechanism for controlling the inlet and outlet members of the explosion chamber, and means coupled with the piston compressor drive for driving the timing mechanism likewise separately from the turbine.

18. In an explosion turbine plant, the combination of a plurality of elongated constant volume explosion chambers each having an inlet member and an outlet member at opposite ends thereof, of apparatus for supplying said chambers with a precompressed operating medium including a rotary piston compressor common to the explosion chambers and comprising the compression stage immediately in advance of the explosion chambers, said compressor having a plurality of variable compression chambers which diminish in volume from the inlet to the delivery side of the compressor and thus effect compression therein of measured, individual portions of the medium fed thereto, means for driving the piston compressor, the number of compression chambers in the piston compressor and its speed of revolution being such that a substantially shock-free, measured delivery of compressed medium occurs, and timing mechanism acting to open the inlet members of the explosion chambers in alternation.

19. The combination as set forth in claim 18, including one or more turbo-compressors in advance of the rotary piston compressor for pre-compression the operating medium fed to the piston compressor.

20. The combination as set forth in claim 18, including one or more turbo-compressors in advance of the rotary piston compressor for pre-compressing the operating medium fed to the piston compressor, a steam turbine for driving the turbo-compressor, means for generating steam with the waste heat of the plant, and a conduit for conducting the steam to the steam turbine.

21. An explosion turbine plant comprising one or more constant volume explosion chambers, having inlet and outlet mechanism, an impulse turbine driven by the gases generated in such chambers, a second turbine arranged to be driven by the gases discharging at super-atmospheric pressure from the first turbine, apparatus for compressing an operating medium fed to the explosion chambers and including a rotary piston compressor immediately in advance of the explosion chambers and connected thereto, said compressor having a plurality of variable compression chambers which diminish in volume from the inlet to the delivery side of the compressor and thus effect compression therein of measured, individual portions of the medium fed thereto, means for driving the compressor, timing mechanism for the inlet and outlet mechanism of the explosion chambers and acting to open the inlets to the chambers while the pressure therein is above atmospheric, the number of compression chambers of the piston compressor, and the normal speed of the compressor driving means being such that a sufficiently large number of compressor chambers discharge per chamber cycle to produce a substantially shock-free, measured delivery of compressed medium to the explosion chambers.

HANS HOLZWARTH.